United States Patent [19]
Crochet, Sr.

[11] 3,866,948

[45] Feb. 18, 1975

[54] COUPLING MECHANISM WITH LATCHING ALSO WITH RELATIVE UNIVERSAL MOVEMENT UNCOVERING BETWEEN OBJECTS

[76] Inventor: Gerald J. Crochet, Sr., 1000 Roselawn Dr., Lafayette, La. 70501

[22] Filed: Nov. 1, 1972

[21] Appl. No.: 302,862

[52] U.S. Cl............................................. 280/478 R
[51] Int. Cl............................................. B62d 53/00
[58] Field of Search ........... 280/477, 474, 481, 486, 280/478, 479, 491

[56] References Cited
UNITED STATES PATENTS

| | | | |
|---|---|---|---|
| 3,404,901 | 10/1968 | Rau............................ | 280/491 A X |
| 3,521,908 | 7/1970 | Carter.......................... | 280/479 R |
| 3,649,048 | 3/1972 | Garnett......................... | 280/477 |
| 3,727,958 | 4/1973 | Peters........................... | 280/508 |

*Primary Examiner*—Leo Friaglia
*Assistant Examiner*—Randall A. Schrecengest

[57] ABSTRACT

The disclosure is to coupling or mechanism which may be set operative to project means to effect latch engagement between objects, the means also being projected to set operative means to permit universal relative movement between the objects. An exemplary application may be a prime mover with a control valve accessible to driver who can turn the valve to operate a hitch housing assembly to latch with the tongue of a vehicle, the hitch housing assembly also being moved to uncover universal joint members in chain of connection whereby the tongued vehicle may be moved responsive to its universal joint connection to the prime mover that pulls it. Many other applications of the invention are within contemplation, as in the field of connected floated vessels as another example.

10 Claims, 9 Drawing Figures

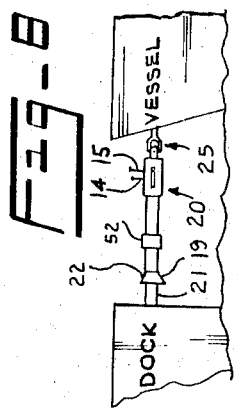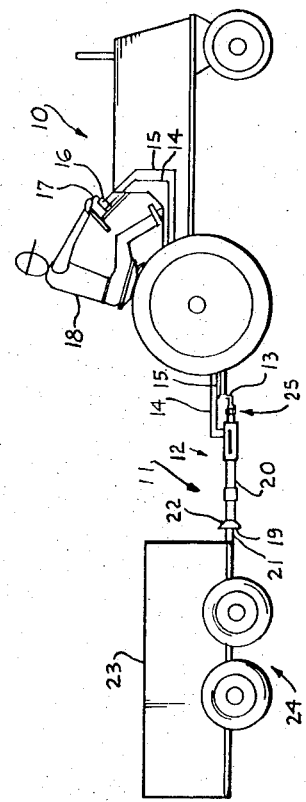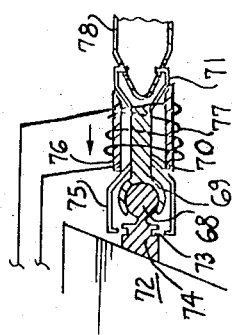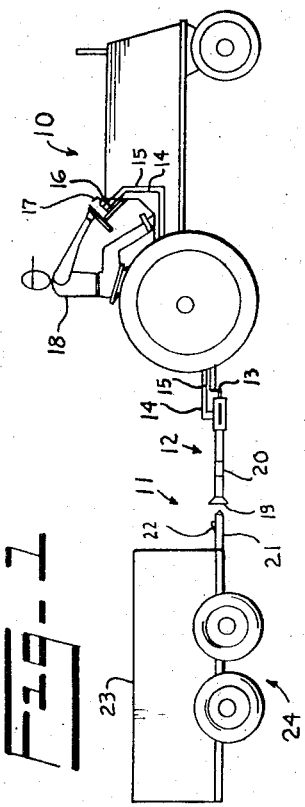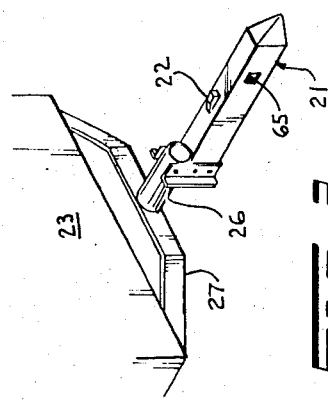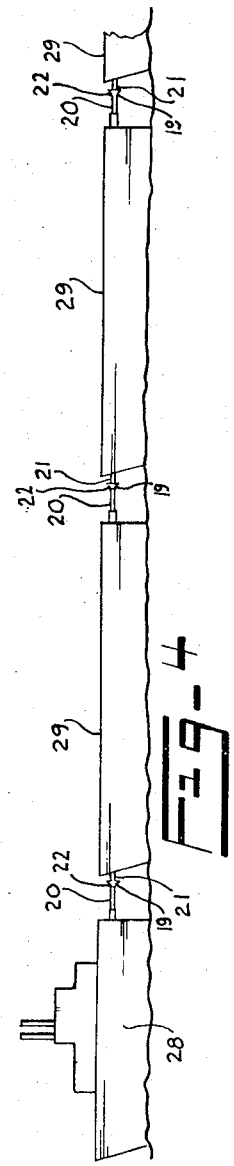

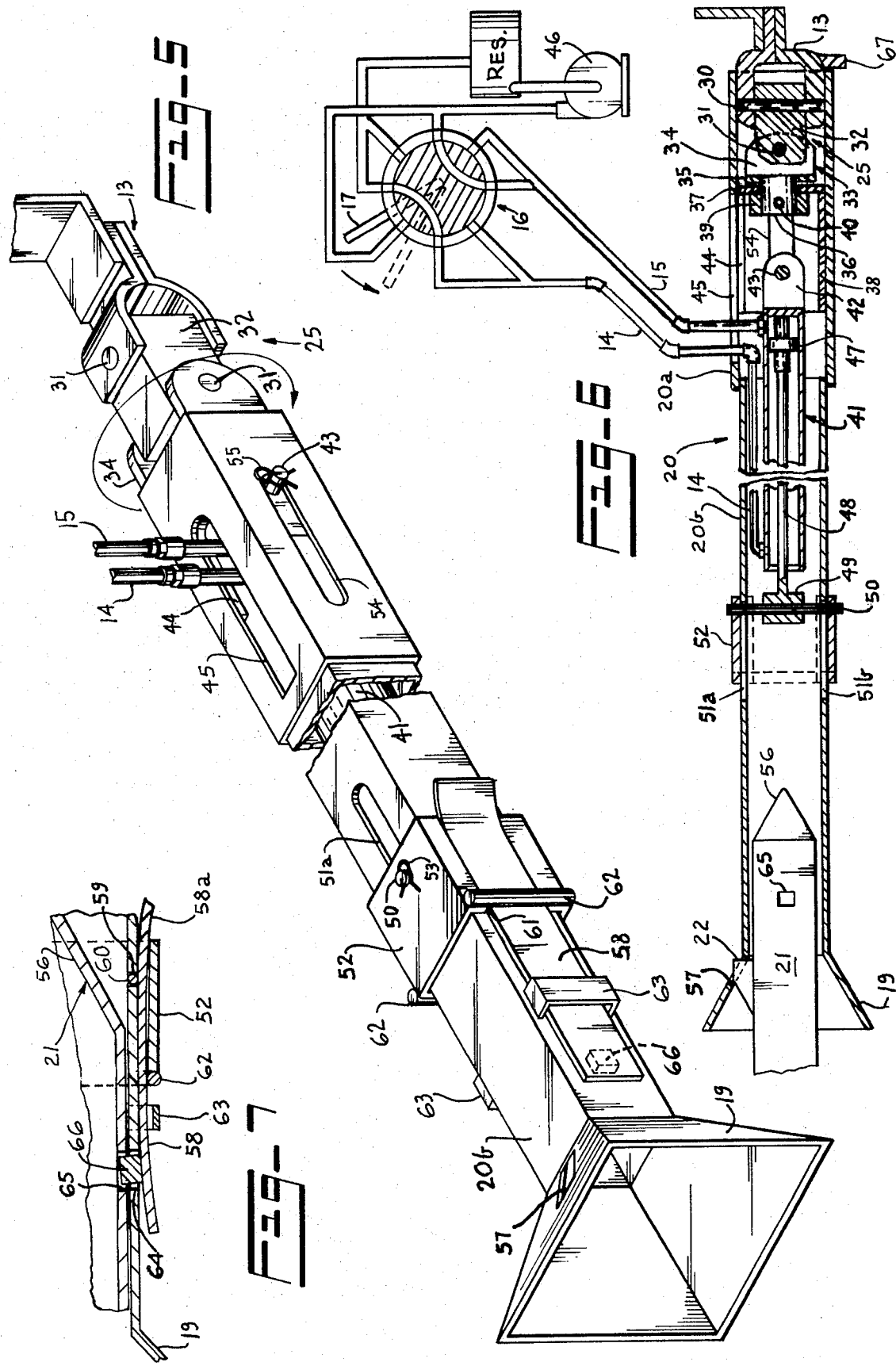

COUPLING MECHANISM WITH LATCHING ALSO WITH RELATIVE UNIVERSAL MOVEMENT UNCOVERING BETWEEN OBJECTS

BACKGROUND OF THE INVENTION

Heretofore, it has been necessary for one man at least to pull a pin to disconnect the universal connection between a prime mover and a pulled vehicle to which the prime mover has been hitched. Usually when this disconnection is made, the pulled vehicle has the universal joint assembly elements attached thereto, and when the pin or connection with the prime mover is pulled by a man on the ground, the universal joint elements fall into an inoperative position.

Later, to make reconnection, one operator is required on the prime mover or tractor, while two or more men are required on the ground dangerously to hold up the universal joint parts and to put in place the pin that connects the universal joint to the conventional drawbar. In British Pat. No. 453,944, issued Nov. 6, 1936, a pivotal connection is made to the prime mover.

Need has long existed for a latching and universal joint uncovering that can be effected by a simple motion, as from the prime mover operator's seat, while he is at the time free for the operation of the prime mover.

Most recent prior art in any manner early related to this field in U.S. Pat. No. 3,649,048, to Garnett, early in 1972, but in this case an operator down on the ground between vehicles manually disconnects a hydraulic cylinder before the two vehicles can be universally connected. Also, in recent years, U.S. Pat. No. 3,521,908 issued July 28, 1970 to Carter, disclosing a hitch with a hitch element withdrawn from an enclosing sleeve, whereby the connection between vehicles was rendered flexible, this construction fails to provide a means of locking its imperfect universal joint while at the same unlatching from the drawn vehicle. Also, this construction requires a man on the ground to unhitch to effect uncoupling of the drawn vehicle or wagon. As the mechanism herein involved stands essentially as a coupling, Ralph Peters, U.S. Pat. No. 3,727,958, which issued Apr. 17, 1973, stands essentially as a mechanism which should best establish classification of the herein involved invention, but lacks the versatility of the instant invention, as to universal movement, and as to response to remote actuation.

The present inventions solve the problem of awkward, slow, dangerous and expensively made connections between objects, as vehicles, water borne vessels, vessels and docks, tractors and carts or drawn agricultural or construction implements, also between planes, planes and gliders, military apparatus as between heliocopters and tanks, heliocopters and smaller weapons, planes and gliders, and the like.

SUMMARY OF THE INVENTION

The present invention relates generally to effecting connection or coupling between objects, as, for instance, connection between a prime mover and a cart or implement to be pulled thereafter, the means and method being operative in manner that a releasable latching is made and connecting means in chain of connection is conditioned to act as a completely universal connection means between the objects.

As a primary object, the invention sets out to provide means and method of effecting releasable latching between objects, also connection means in chain of connection is rendered operable as a completely universal connection means between the objects.

It is also another and more specific object to provide means and method of this class that will effect latching, as between a prime mover and a cart or implement to be drawn thereafter, connection means, as universal joint parts at outset sleeved against movement, being uncovered as, or promptly after latching occurs, so that there is permitted complete universal relative movement between the elements thus connected.

It is also an additional object of the invention to provide means and method of this class to effect latching and to render connection conditioned for complete universal relative movement between object and object, between prime mover and cart or implement, between water borne vessels, between vessel and dock, between aeroplanes, between planes and gliders, between heliocopters and tanks, howitzers and other weapons, and between suitably connectable elements of every type and description.

Other and further objects will be apparent when the specification hereinbelow is considered in relation to the drawings, forming a part thereof, and which will be briefly described immediately herebelow.

BRIEF DESCRIPTION OF THE DRAWINGS

In the accompanying drawings forming a part of this specification and wherein like reference numerals are applied in the various views to designate like parts:

FIG. 1 is a small scale elevational view showing tractor and cart equipped for the employment of an embodiment of the invention with tractor being backed in direction for hitch housing rigidly cantilevered behind to receive tongue of cart therein.

FIG. 2 is a small scale elevational view of the tractor and cart shown in FIG. 1 with hitch housing latched with tongue, and with universal joint parts uncovered for complete universal movement between cart and tractor, as tractor is in process of starting forward to draw the cart thereafter.

FIG. 3 is a fragmentary isometric view of the lower front part of a cart, showing a form of tongue construction as included by the invention.

FIG. 4 is a small scale elevational view showing a tugboat connected to a lead barge by a form of the invention, and thereafter a succession of towed barges thus connected, one to the other.

FIG. 5 is a large scale isometric view of a hitch housing assembly as employed in an embodiment of the invention, the universal joint elements in a chain of connection means being shown uncovered so that complete universal relative movement between connected objects can take place.

FIG. 6 is a large scale sectional elevational view, partially diagrammatic, showing a hitch housing of the type of construction shown in FIG. 5, with cart tongue in rear end of hitch housing, valve handle in full line position representative that the piston in the hydraulic cylinder is just at start of movement to effectuate latching of the rear end portion of the hitch housing with the tongue.

FIG. 7 is a sectional plan view taken along line 7—7 of FIG. 6, showing dog latch between hitch housing and tongue.

FIG. 8 is a small scale, fragmentary elevational view, showing an embodiment of the invention with tongue extending from a fixed object, as a dock, and with hitch housing latching end releasably latched to the tongue from the dock, the universal joint members in chain of connection from water borne vessel through hitch housing being uncovered to permit the vessel complete universal joint movement with relation to the fixed dock.

FIG. 9 is a fragmentary sectional elevational view, partially diagrammatic, of another embodiment of the invention, with the element corresponding with the hitch housing in FIGS. 1-8, also operative in this view in correspondence with the armature of a solenoid.

BRIEF DESCRIPTION OF THE INVENTION

The invention in the form or embodiment initially most prevalently employed, makes use of a coupling comprising as a projectable member a hitch housing assembly including a latching sleeve connected to the outer piston rod end from the piston of a hydraulic cylinder, that extends within the hitch housing without connection thereto. At the cylinder end opposite its piston rod, a chain of universal joint elements connect the cylinder to the tractor or prime mover. When a control valve is turned to admit hydraulic fluid into the head of the cylinder, the latching sleeve is moved toward the tongue of a cart to be connected to and drawn by the tractor, the tonge having dog holes in the sides thereof. The latching sleeve, as its cross-bar though the piston rod outer end moves in a short slot in the hitch housing, sets the dogs of dog latch bars in the dog holes in hitch housing and tongue, and the tongue and hitch housing are latched together. Further fluid admission moves the whole hitch housing toward the cart to which it is now latched, and thus pushes the cart away from the tractor while a long slot in the hitch housing moves with relation to the fluid connection into cylinder as the hitch housing uncovers the universal joint elements whereby relative complete universal connection is effected between tractor and cart.

DETAILED DESCRIPTION OF PREFERRED EMBODIMENTS

Making reference now to the drawings for a better understanding of the invention, a tractor 10 is shown in FIG. 1, with mechanism 11 behind a coupling including a hitch housing assembly 12 that appears rigidly cantilevered rearwardly of the tractor at the level of its drawbar 13, the forward element of the hitch housing assembly 12, to be hereinbelow described in detail, being rigidly connected to parts of drawbar 13. Fluid conduits 14 and 15 are shown extending upwardly and forwardly from the hitch housing assembly 12, with the same conduits 14 and 15 being shown forwardly in the tractor 10 and extending to a valve 16 with handle 17 in hand reach of the driver or operator 18.

The guide funnel of the hitch housing 20 of the hitch housing assembly 12, is indicated as comprising its rearmost element, and this guide funnel 19 is indicated in FIG. 1 as disposed, upon further rearward movement of the tractor 10, to receive the point and thereafter the forward portion of a tongue 21 having a stop lug 22 on the upper surface thereof. The cart 23 that provides the tongue 21 forwardly, is shown mounted on a set of tandem wheels 24, this type of cart or wagon 23 being well known in agricultural usages, as for hauling rice, sugar cane, or other agricultural products.

As shown in FIG. 2 the operator of the tractor is shown as having his hand on the valve handle 17, a projectable member including the hitch housing 20 has moved rearwardly in extent to so that only the rear portion of the tongue 21 can be seen, while the stop lug 22 is visible in small part forwardly in the guide funnel 19.

In the view of FIG. 2, universal joint parts, comprising a universal joint assembly 25, in front of the forward end of the hitch housing 20, since it has now moved rearwardly, are now visible and represent that part of the hitch housing assembly 12 which the aforesaid rearward movement of the hitch housing 20 has uncovered. As will be hereinbelow described, these parts are so constructed and related that the cart or wagon 23 can move relatively in three planes with relation to the tractor 10.

As shown in FIG. 3, a tongue 21 is shown connected to the stub 26 of a conventional tongue, as for purposes of mounting the tongue 21 at proper elevation for entry into the guide funnel 19. On the other hand the tongue stub 26 extends forwardly from a conventional mounting bracket 27 on the lower, forward part of the cart or wagon 23.

FIG. 4 shows the above described apparatus employed in an alternative usage, with a tongue 21 extending forwardly toward a tugboat or towboat 28, as installed to extend substantially horizontally from the bow of a barge 29, the tongue 21 being latched into the rear end portion of a hitch housing 20. Also a hitch housing 20 is shown extending rearwardly from, or cantilevered from, the stern of each successive barge 29, in chain behind the tugboat 28, with a tongue 21 extending substantially horizontally forwardly from the bow of each barge 29, and engagement with the hitch housing 20 immediately in advance thereof.

Considering together FIGS. 5, 6 and 7, the hitch housing 20, in FIG. 6, is shown in its most forward extent, with a forward portion 20a enlarged in cross-section thus to fit snugly over an element generally termed the tractor drawbar 13, which is drilled through centrally, vertically to provide a first pivot bore for a pivot pin 30 about which deflection or articulation may occur as one function of the universal joint assembly 25; the first pivot pin 30 also passing through a block 32 interposed between upper and lower draw bar parts, as shown in FIG. 6.

A transverse, horizontal bore is drilled through the articulation block 32 rearwardly of the articulation or first pivot pin 30 a second pivot bore being provided for a rocker pivot pin 31 which permits (performance of the relative) up-and-down or rocker function of the universal joint assembly 25.

Thus, the pivot pin 31 passes horizontally through the block 32 at right angles to the axis of the pin 30 and connects the block 32 to a swivel assembly 33. The swivel assembly 33 comprised of a pair of ears or wing elements 34, through which the pin 30 passes on opposed sides of the block 32, the ears being spaced apart and connected by a vertical plate 35 of rectangular crosssection. As shown in FIG. 6, the clear height in the housing portion 20a is greater than the height of the vertical plate 35, but the transverse distance from outer side of ear 34 on one side to the outer side of ear 34 on the other side is within snug sliding clearance measurement of the clear width across the housing portion 20a, inside to inside dimension. Also, the height of the plate 35, shown upright in FIG. 6, is substantially equal to this inside to inside width dimension of the housing portion 20a, minus slight sliding tolerance. The side sway or swivel assembly 33 also comprises a swivel pin 36, passed centrally through the plate 35 and affixed rigidly thereto, as by welding, with the swivel pin 36 passing with rotatable clearance through a plate 37, of rectangular cross-section that fits, with slight clearance tolerance, within the housing portion 20a. The plate 37 comprises the forward end closure of a guiding adapter box 38 that fits with sliding clearance within the housing portion 20a. The swivel pin 36 extends within the box 38 and has a round nut 39 affixed thereto, as by a screw member 40 that is threaded through the nut 39, these elements thus completing the swivel assembly 33.

A hydraulic cylinder 41 has ears 42, or optionally a single lug 42, through which a draft pin 43 is press-fitted or passed rigidly the outer end portions of the draft pin 43 extending outwardly on each side to slide in slots 54, thus operationally to connect the hydraulic cylinder 41 to the guiding adapter box 38 of the hitch housing assembly 25. The opposed slots 54 are shown extending longitudinally, centrally, for the length of the box 38, up to the end plate 37, while a slot 45 in the Line 29, before housing insert: top plate of the guiding adapter box 38 of the housing assembly portion 20a terminates forwardly at the same extent longitudinally forwardly as extend the opposed slots 54, while such slot 45 extends rearwardly to a distance substantially near the rearward end of the housing section 20a, for a purpose to be hereinbelow described.

As shown in FIG. 6, an operating means includes the pump 46, RES., valve 16 and its conduit system and handle 17, also the conduits 14, 15, to the opposed ends of the also included hydraulic cylinder 41. The valve handle 17 is represented in full line position, as just having been turned to this position from a reverse or from an intermediate or neutral position to establish fluid delivery from a pump 46, as provided by the tractor 10, the fluid to pass through the valve 16 and by way of the conduit 15 into the head of the hydraulic cylinder 41 just above its piston 47, shown in FIG. 6 at head of stroke. Thus fluid return is shown from very near the bottom of the cylinder 41, by way of return conduit 14, through the valve 16, to the reservoir RES., from which the pump 46 takes suction.

The piston rod 48 is shown in FIG. 6 as passing through the base of the hydraulic cylinder 41, and as having outwardly thereof, a cylindrical yoke 49, with a draft pin 50 passed therethrough, the draft pin 50 extending outwardly through opposed slots 51a ( upper ) and 51b ( lower ) in the reduced dimension hitch housing portion 20b. A tongue latch sleeve 52 is shown in FIGS. 5 and 6 as slidable upon the housing portion 20b, a cotter pin 53 being shown in FIG. 5 as passed transversely through the upper end of the draft pin 50, with a corresponding cotter pin, not shown, being assumed as passed through the lower end of the draft pin 50. In passing, back reference may be made to slot 54, FIGS. 5 and 6, with the draft pin 43 extending transversely outwardly through the slot 54 in FIG. 5, and with a cotter pin 55 being shown as passed transversely through the end of the draft pin 43, the opposite side providing a corresponding slot for the draft pin opposite end to pass through to be retained by a corresponding cotter pin.

Reiterating and expanding upon conditions recited as represented in FIG. 6, a tractor 10 has been backed in direction that first the tongue point 56 of the tongue 21 extending forwardly from a vehicle or cart 23 to be engaged, has been enshrouded by the guide funnel 19 of the hitch housing rear portion 20b, and as the tractor 10 is backed further the tongue 21 is received into the hitch housing rear portion 20b and into a stop slot 57 in the forward, top plate of the guide funnel 19, and the rear end face of the hitch housing portion 20b engages against the forward face of the stop lug 22. This occurrence is a signal to the operator 18 that the two vehicles 10, 23, are in proper relative position to be latched together. The operator 18 now turns the valve handle 17 to the full line ( forward in FIG. 6 ) position so that hydraulic fluid is delivered into the head of the hydraulic cylinder 41, thus to exert fluid pressure on the forward face of the piston 47 and urge it rearwardly. Consequently the piston rod 48 moves rearwardly out of the cylinder 41 and slides rearwardly the tongue latch sleeve 52 as the draft pin 50 moves rearwardly in the opposed upper and lower slots 51a, 51b.

Now considering FIG. 7 in relation to FIG. 6 and especially in relation to FIG. 5, opposed dog carrying cam bars 58 are mounted on either side of the rearwardly disposed part of the reduced dimension, rearward hitch housing portion 20b, the construction and operation of the right side cam bar 58 being hereinbelow set forth in detail. Obviously, the oppositely disposed cam bar is correspondingly constructed and operated.

The housing portion 20b has a pivot slot 59 provided therein through the side thereof to receive therein a vertically disposed pivot rod 60 that is affixed to the inner face of the cam bar 58. The cam bar portion outwardly of the pivot rod 60 is best shown in FIG. 5 as disposed in a longitudinally extending slot 61 through the side of the tongue latch sleeve 52, this slot 61 being best visualized by a consideration of the isometric view of FIG. 5. The upper and lower parts of the tongue latch sleeve 52, are shown held together by vertical cam bars or rods 62.

The cam bar 58 is shown in FIG. 5 as extending further rearwardly along the side of the hitch housing portion 20b, and through a guide and retaining bracket 63 that extends out sidewardly from the side of the hitch housing portion 20b, the oppositely disposed bracket 63 also being visible in FIG. 5. Rearwardly of the bracket 63 a dog slot 64 is provided in the rear hitch housing portion 20b, and a matching or mating slot 65 is shown in the tongue 21. In the rearwardly projected position of the tongue latch sleeve 52, a dog 66 attached to the inner face of the cam bar 58 is shown extended inwardly into tongue latching position and thus through the cam bar slot 64 and at least into the slot 65 in the tongue 21. A consideration of FIG. 7 will show that this dog latching through hitch housing into tongue has resulted as the portion of the cam bar 58 rearwardly of the pivot rod 60 has been tracked inwardly in passage between the cam bar rod or rod cam 62 and the hitch housing side, the pivot rod 60 serving as pivot for the cam bar 58, as its name implies.

The forward end portion 58a of the cam bar 58 is normally curved outwardly, as best seen in FIG. 5. It can thus be seen that unlatching of the dog 66 will be effected if the tongue latch sleeve 52 is moved forwardly to urge the forward part of the cam bar 58 sidewardly inwardly. As this occurs, or to accomplish this result, the cam bar rod or rod cam 62 moves forwardly over the outer surface of the cam 58, while the cam bar 58 pivots about its pivot rod 60. Thus the rearward part of the cam bar 58 swings outwardly until stopped by contact with the vertical plate of the retaining bracket 63, the dog 66 being withdrawn outwardly from slot engagement.

It can be visualized that when the yoke pin 50, in rearward movement of the tongue latch sleeve 52, reaches the rear ends of the opposed upper and lower hitch housing slots 51a, 51b, any further rearward movement of the piston rod 48 must urge the whole hitch housing 20 rearwardly. As determined by design, total piston rod travel must be greater than, or at least equal to, the sum of yoke pin 50 travel in slots 51a, 51b, and travel to uncover universal joint 25.

As shown in FIG. 5, after the tongue latch sleeve 52 has been moved to latch the dogs 66 in the tongue 21, the yoke pin 50, as urged further rearwardly, has urged the forward hitch housing portion 20a rearwardly to uncover a pin 30 and the block 32 through which it passes, whereby the block 32 can freely swivel in the horizontal plane from side to side. Also, further hitch housing rearward movement has uncovered the pivotal cross-pin 31, and the ears and plate 34, 35 of the swivel assembly 33 so that a drawn vehicle can swivel or bounce up and down or pivot in a vertical plane about the pivot axis 31. Also, the drawn vehicle could swing completely around about a longitudinally rearwardly directed swivel axis, as that axis of the swivel pin 36. In effect, the drawn vehicle 23 could turn completely over sidewardly and complete 360 degrees of turning and erect itself again. In this regard, since FIG. 5 is an isometric view, the swivel assembly plate 35 is not visible, but the description of uncovering includes the swivel assembly plate 35 (from which the ears 34 extend forwardly) as being an element that has to be uncovered to arrive at completely free universal motion relatively permitted between the tractor 10 and the drawn vehicle or implement, as the cart 23.

When it is desired to unlatch from a drawn vehicle or implement the operator 18 turns the valve handle 17 (rearwardly in FIG. 6) to broken line position, so fluid is delivered into the rear end of the hydraulic cylinder 41, to urge forwardly against the rear face of the piston 47 so that the piston rod 48 begins to be drawn back into the cylinder 41, and the draft or yoke pin 50 draws the tongue latch sleeve 52 forwardly, the rear portions of the cam bars 58 swinging outwardly to throw the dogs 66 out of engagement, as these cam bars 58 pivot about their pivot pins 60. When moved sufficiently forward, the tongue latch sleeve yoke pin 50 comes into contact with the forward end surface of the hitch housing slots 51a, 51b.

Noticeably, in uncovering the universal joint assembly 25, the rearward movement of the hitch housing 20, as connected to the tongue 21, has either resulted in the cart or drawn vehicle or implement 23 having been pushed rearwardly the amount of travel required to uncover the universal joint assembly 25. Now, upon disengaging, after dog unlatching has been effected by tongue latch sleeve forward movement, the tongue 21 is still in the same position relative to the hitch housing 20 as it was in when latched. Now, as further fluid is admitted into the lower or rearward end of the hydraulic cylinder 41, the hitch housing 20 is urged forwardly by the yoke pin 50, as the tongue 21 is uncovered by the rear portion 20b of the hitch housing 20 being moved forwardly from around the tongue 21. Also, as this occurs the forward hitch housing portion 20a first moves about and latches therewithin the swivel assembly plate 35, then latches in inner, sideward abutment with the swivel ears 34, then latches around the block 32, and extends to position over and under the drawbar 13, the inner side faces of the hitch housing portion 20a being in abutment with the side faces of the parts of the drawbar 13, as can best be visualized from a consideration of FIG. 5. In this forward position the forward end face of the forward hitch housing portion 20a is in contact with a stop lug 67 on the drawbar 13. As the hitch housing 20 has been moving forwardly, the respective slots 45 and 54 have been moved forwardly with relation to the fluid conduits 14, 15, and the draft pin 43 at the head of the hydraulic cylinder 41. See FIGS. 5 and 6.

In search of terse definitions, the whole hitch housing assembly, including its structurally connected parts 20a, 20b, and 19, also the latch sleeve 52, draft pin 50, yoke 49, piston rod 48, and piston 47, all considered together may be termed a projectable member. Also, properly the term connection means may be applied to the cam bar 58, parts connected thereto, and cooperative therewith. The universal joint assembly 25 stands as its three functional parts permitting articulation, rocker movement; and side way or relative rotation about axis of travel, have been hereinabove described. Obviously the prime mover 10 and drawn vehicle 23 stand as two objects latched together to travel in tandem.

In cases where the load to which hitch is made may be extremely heavy, or in cases where a fixed object, as a DOCK, FIG. 8, is latched to, then after, or as latching occurs, the lead vehicle, tractor, vessel or the like, as the VESSEL in FIG. 8, can and will be urged forwardly or away from the object to which hitch has been made. This is obvious, since if the piston rod 48 is brought to a stop, as with the yoke pin 50 at the ends of slots 51a, 51b, and with the object to which hitch is made immovable, then, if hydraulic fluid continues to be admitted into the head of the cylinder, FIG. 6, the hydraulic cylinder 41 must move forwardly, urging through the universal joint assembly of parts 25, and through the drawbar 13, to whatever the drawbar 13 is attached, to push this object outwardly, the universal joint parts moving out of the hitch housing 20, the fluid conduits 14, 15, for this illustration assumed to be rigidly piped from the vessel, moving with the VESSEL and hence outwardly with relation to the slot 45.

The invention is not limited to universal joints comprised of mechanical parts, as the universal joint assembly 25 hereinabove described, and a form of the invention is shown diagrammatically in FIG. 9 in which a ball 68 in a socket 69 on a rod or shaft 70 having latch springs or fingers 71 on it end opposite the ball 68, comprises the longitudinally centrally extending core of the invention. The prime mover 72, corresponding with the tractor, pulling, or towing object, is indicated as a water borne barge in FIG. 9 having an annular connection groove 73 in the horizontally extending stern post 74 that carries the ball 68 as its outermost member. Spring like latch fingures 75, shown larger than the fingers 71, extend forwardly and are oppositely affixed to the forward part of the rod or core 70, just rearwardly of the socket 69. A sleeve 76, around the core or rod 70, corresponds with the armature of a solenoid, with wiring 77 therearound empowered from the barge 72.

As shown in FIG. 9, the sleeve type armature 76 has been projected outwardly to latch the outer latch fingers 71 in a drawn object 78, as a skow or raft, while the forward latching fingers 75 are unlatched from within the groove or latch openings 73 so that the universal joint parts 68, 69, are uninhibited and can thus permit free relative universal movement between the objects 72, 78. Now the switch to close circuit to the wiring 77 may be reversed, thus to move the solenoid sleeve 76 forwardly, thereby to urge the latch fingers 75 into the groove or latch openings 73, thus immobilizing the ball and socket joint 68, 69, from permitting movement therein between. At the same time the outer latch fingers 71 are released as the solenoid sleeve 76 move out of contact with these fingers, and the sleeves are freed to spring outwardly and disengage the skow or raft 78. Conversely, change of direction of operation of solenoid functions, as by switch operation aboard the barge 72, restores condition shown in FIG. 9, with solenoid sleeve 76 moved rearwardly, raft 78 latched to be towed, and universal joint 68, 69, unimpeded in operation.

The illustration set forth immediately hereinabove is by way of example that the invention is susceptible to practice in various forms falling within the broad scope and spirit thereof. Obviously many more coupling embodiments may serve, some number of others coupling methods and method steps are included within the broad scope and spirit hereinabove introduced. Also, the appended claims are exemplary, and by way of introduction and illustration, and not by way of limitation, with claim scope to be developed by prosecution.

I claim:

1. A coupling mechanism for employment with two objects to be latched together for travel in tandem, said coupling mechanism including a projectable member, a universal joint assembly with respective members adapted to permit articulation, relative rocking vertically, and side sway or rotation about axis of travel, operating means to project said projectable member in one direction for an included connection means to effect latching between said objects and to move said projectable member in such relation to said universal joint assembly as to permit relative universal movement, between objects, said projectable member upon projection to another position by said operating means, transforming said universal joint assembly by engagement therewith to effectuate substantially rigid connection between said objects.

2. Coupling mechanism as claimed in claim 1, in which said projectable member comprises a hitch housing assembly, in which one of said objects comprises a vehicle, and in which the other of said objects comprises a prime mover.

3. Coupling mechanism, as claimed in claim 1, in which said projectable member includes a hitch housing and parts connecting said hitch housing for projection by the piston rod of a piston also included by said projectable member, said coupling mechanism also having a valve controlled hydraulic cylinder included by said operating means and with operative means actuation accessible in one object to the single operator of the object and of the coupling mechanism.

4. Coupling mechanism as claimed in claim 1 in which said operating means includes a hydraulic cylinder, with piston and its piston rod being included by said projectable member.

5. Coupling mechanism as claimed in claim 1 in which one of said objects has a tongue member installed thereon wherewith connection means latching is effected.

6. The method of conditioning two objects for travel in tandem, one first to be substantially rigidly coupling connected to the other, the coupling connection then to be translated into a universally coupling connected relationship for relative universal movement thereinbetween, said method comprising the steps of actuating a projectable member to releasably latch the objects together in substantially rigidly connected relationship, and further actuating the projectable member to a position that sets operative universal coupling connection between the objects, and employing the objects for travel in tandem as universally connected whereby one of the objects may move substantially universally with relation to the other.

7. The method as claimed in claim 6, in which the actuation of the projectable member may be initiated by the operator of one of the coupled objects from his operator's position, whereby all steps may be effectuated as controlled by this single operator.

8. The method as claimed in claim 6, in which the projectable member actuation to latch, and the projectable member actuation to a position that sets operative universal coupling connection between the objects, are carried out substantially simultaneously.

9. The coupling method as claimed in claim 6, in which, after latching, actuation of projectable member motion is effected in the same direction of motion as required to effect latching.

10. The coupling method as claimed in claim 6, in which, after latching further actuation of the projectable member results in coupling connection urging movement of an object bearing universal coupling connection in direction opposite projectable member movement to accomplish latching.

* * * * *